United States Patent [19]

Kitagawa

[11] Patent Number: 4,618,237
[45] Date of Patent: Oct. 21, 1986

[54] MOTOR DRIVE FOR CAMERA

[75] Inventor: Masahiro Kitagawa, Hachioji, Japan

[73] Assignee: Olympus Optical Co., Ltd, Tokyo, Japan

[21] Appl. No.: 760,136

[22] Filed: Jul. 29, 1985

Related U.S. Application Data

[63] Continuation of Ser. No. 587,637, Mar. 8, 1984, abandoned.

[30] Foreign Application Priority Data

Mar. 17, 1983 [JP] Japan .................................. 58-44860

[51] Int. Cl.$^4$ .............................................. G03B 7/00
[52] U.S. Cl. .................... 354/412; 354/173.11
[58] Field of Search ................. 354/412, 173.1, 173.11

[56] References Cited

U.S. PATENT DOCUMENTS 4,190,340 2/1980 Maida ............................ 354/173.11
4,458,999 7/1984 Mashiono et al. ............. 354/173.11

FOREIGN PATENT DOCUMENTS

0086015 7/1974 Japan .
0062628 5/1975 Japan .

Primary Examiner—Russell E. Adams
Attorney, Agent, or Firm—Louis Weinstein

[57] ABSTRACT

A motor drive which is adapted to be used with a camera having a mechanical shutter release mechanism is modified to enable the motor drive to be mounted in a camera having an electromagnetic shutter release mechanism, by providing a circuit which produces an electromagnetic release signal. The likelihood of blurring which may be caused by the rotation of a motor during the exposure of a film and which may be caused by the mere provision of the circuit for producing an electromagnetic release signal is avoided by preventing the rotation of the motor during the exposure of the film. In addition, difficulties are also avoided which are experienced when a film, not subject to any winding operation, is loaded into the camera.

22 Claims, 9 Drawing Figures

MOTOR DRIVE FOR CAMERA

This is a continuation of application Ser. No. 587,637, filed Mar. 8, 1984 now abandoned.

BACKGROUND OF THE INVENTION

The invention relates to a motor drive for camera, and more particularly, to a motor drive which can be mounted and used in a camera of either type including a mechanical shutter release mechanism or electromagnetic shutter release mechanism.

As is well recognized, a shutter release mechanism of a photographic camera can be categorized into a mechanical type and an electromagnetic type. A camera including a mechanical shutter release mechanism has a member connected to the shutter release mechanism and which is engaged by a transmission member of a motor drive of the type which can be mounted in such camera. As a motor of the motor drive rotates, the transmission member is displaced to urge its engaged member for movement, thereby triggering the shutter release mechanism of the camera. On the other hand, a camera including and electromagnetic shutter release mechanism need only be provided with a terminal which receives a shutter release signal from an associated motor drive. A motor drive which is mounted on such camera supplies a shutter release signal which is transmitted through the terminal to trigger the shutter release mechanism.

Thus there have been two kinds of motor drives for use in a camera including a mechanical shutter release mechanism and another camera including an electromagnetic shutter release mechanism. However, it will be appreciated that the provision of separate kinds of motor drive for use with different types of cameras represents an economic disadvantage and a cumbersome operation by a user.

To accommodate for this, a motor drive is contemplated which is designed for use in a camera including a mechanical shutter release mechanism and which is additionally provided with a terminal for transmitting a shutter release signal therethrough so that an electromagnetic shutter release mechanism may also be triggered. However, this involves the following inconvenience:

Specifically, in a camera including a mechanical shutter release mechanism, a motor switch in a motor drive changes from a release side to a winding side in response to a release operation substantially at a coincident timing with the operation of a mirror switch which detects the initiation of a photographing operation within the camera. However, both switches do not always operate concurrently in a camera including an electromagnetic shutter release mechanism, in which a shutter release operation switch of the motor drive, and the camera begins its exposure operation before a release operation within the motor drive is completed. Even though this does not cause a movement of the film due to the provision of a lock mechanism, oscillations produced by the operation of a motor may cause a blurring.

In another camera including an electromagnetic release mechanism in which a control such as a diaphragm control and/or focussing control takes place upon depression of the operating switch before a shutter release operation occurs, an exposure process within a camera may not be initiated when the motor drive has completed its release operation. Since then the motor drive is incapable of determining whether it is before the initiation or after the termination of an exposure process within the camera, a memory storage must be provided in the motor drive for storing the fact that an exposure process has been initiated and terminated. However, this causes another difficulty in a certain motor drive of the type which switches automatically between a release mode and a winding mode by mechanically detecting an increase in the winding torque as an indication of the completion of a film winding operation. In this instance, the mechanical arrangement is such that the termination of exposing the entire film is detected by the failure of a camera to begin a photographing operation in response to a release operation performed under the drive from the motor. Accordingly, if a memory storage is provided in such motor drive, the operating switch must be depressed twice to initiate a film winding operation when the motor drive is mounted in and used for the first time in a camera having an unexposed film, which is inconvenient.

SUMMARY OF THE INVENTION

It is an object of the invention to provide a motor drive for cameras which is originally designed for use in a camera including a mechanical shutter release mechanism and in which a terminal is provided to transmit a release signal to enable its use in a camera including an electromagnetic shutter release mechanism.

It is another object of the invention to provide a motor drive of the type described which additionally includes another terminal for transmitting an in-exposure or exposure operation signal from a camera to the motor drive, thereby ceasing the rotation of a motor thereof during an exposure process which occurs within the camera.

It is a further object of the invention to provide a motor drive including means for storing an exposure process which has taken place within a camera and also including another means for storing the rotation of a motor to effect a first shutter release operation in response to the operation of an operating member, whereby a rotation of the motor to effect a film winding operation is initiated at a given time interval after the termination of the rotation of the motor to effect the first shutter release operation if an exposure process has not been initiated in response to the termination of such rotation.

In accordance with the invention, there is provided a motor drive for use either with a camera of the type including a mechanical shutter release mechanism or an electromagnetic shutter release mechanism. This represents an advantage in that in the prior art practice, a devoted motor drive must be used with the camera of either type. During an exposure process which occurs within the camera, the rotation of the motor is interrupted, thus preventing a blurring which might result from the motor rotation. When unexposed film is loaded into the camera, a single operation of the operating member is sufficient to complete a film winding operation.

DESCRIPTION OF PREFERRED EMBODIMENT

Figure 1:
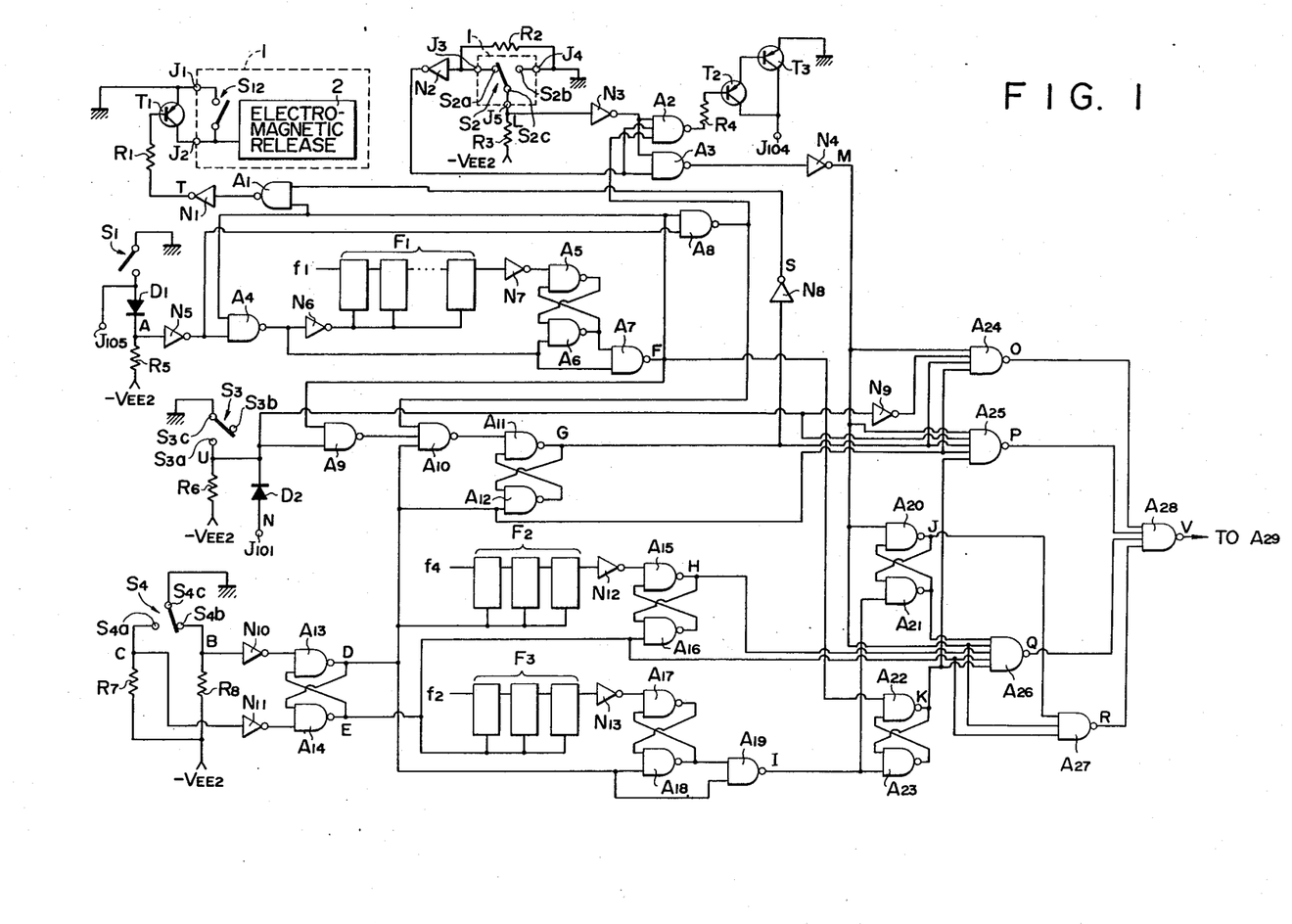
FIG. 1 is a circuit diagram of an essential part of a control circuit used in a motor drive according to one embodiment of the invention.

Referring to FIG. 1, there is shown an essential part of a control circuit which is used in a motor drive according to one embodiment of the invention. The motor drive includes a normally open operating switch S1 which has its one end connected to the ground and its other end connected to a terminal J105, to which a power supply (see FIG. 3) is connected, and also to the anode of a diode D1. The switch S1 is used to command a shutter release operation and a film winding operation within an associated camera. The cathode of the diode D1 is connected through a resistor R5 to a power source, not shown, having a potential $-V_{EE2}$, and is also connected to the input of an inverter N5. The output of the inverter N5 is connected to one input of NAND gate A8 and to one input of NAND gate A4. The output of the gate A4 is connected to the input of an inverter N6, to one input of NAND gate A6 and to one input of NAND gate A7. The output of the inverter N6 is connected to the reset input of each of a bank of flipflops F1 which are in cascade connection to form a binary counter. A pulse signal of a frequency $f_1$ is supplied to the flipflop which represents the first stage of the counter, while the flipflop which represents the last stage of the counter has its output connected through an inverter N7 to one input of NAND gate 45. The output of the gate A5 is connected to the other input of the gate A6, the output of which is in turn connected to the other input of the gate A5. In this manner, the combination of gates A5 and A6 defines an RS flipflop.

The output of the gate A6 is also connected to the other input of the gate A7, the output of which is connected to the other input of the gates A4 and A8, to one input of NAND gate A1, to one input of NAND gate A9, and to one input of NAND gate A22. An output signal from the gate A7 is denoted by F which normally assumes a high level (hereafter abbreviated as "H"), but which assumes a low level (hereinafter abbreviated as "L") for a given time interval determined by the frequency $f_1$ and the bank of flipflops F1 in response to the closure of the switch S1. Thus, when the switch S1 is closed, a single negative pulse signal is the resultant output from the gate A7. The output of the gate A8 is connected to a third input of a three input NAND gate A2 and also to a first input of a three input NAND gate A10. The gate A8 delivers an "H" signal during the time the switch S1 is turned on.

A camera is indicated by blocks 1, 1 shown in phantom line in the upper, left-hand corner of FIG. 1, and includes a mirror switch S2 which is mechanically interlocked with a movable mirror, not shown, which moves downward when an object being photographed is being observed and which moves upward when a picture is to be taken. The switch S2 is formed by a changeover switch and includes a down contact S2a which is engaged by a movable contact as the movable mirror moves down. The contact S2a is connected through a terminal J3 to the input of an inverter N2 which is contained in the motor drive. The switch S2 also includes an up contact S2b which is engaged by the movable contact as the movable mirror moves upward. The contact S2b is connected to the ground within the motor drive through a terminal J4. A resistor R2 which is contained in the motor drive is connected across the terminals J3, J4. The movable contact S2c of the mirror switch S2 is connected through a terminal J5 to one end of a resistor R3 having a resistance less than that of the resistor R2 and to the input of an inverter N3, both forming part of the motor drive. The other end of the resistor R3 is connected to a power source, not shown, having the potential $-V_{EE2}$.

The output of the inverter N2 is connected to a second input of the gate A2 and to one input of NAND gate A3 while the output of the inverter N3 is connected to a first input of the gate A2 and to the other input of the gate A3. The output of the gate A2 is connected through a resistor R4 to the base of a PNP transistor T2, the collector of which is connected to a terminal J104, which is connected in turn to a power supply shown in FIG. 3. The emitter of the transistor T2 is connected to the base of another PNP transistor T3, the collector of which is connected to the terminal J104. The emitter of the transistor T3 is connected to the ground. The output of the gate A3 is connected to the input of an inverter N4, the output of which is in turn connected to a first input of NAND gate A24, to a first input of NAND gate A25, to one input of NAND gate A20, to a second input of NAND gate A26 and to a second input of NAND gate A27. The inverter N4 produces an output signal M which assumes an "H" level when the mirror is down, thus indicating the position of the movable mirror.

The motor drive also includes a photographing mode selection switch S3 which is effective to select either a single frame mode or a consecutive frame mode. The switch S3 includes a movable contact S3c which is connected to the ground. It also includes a single frame contact S3a which may be engaged by the movable contact when the single frame mode is selected and which is connected to one end of a resistor R6, the other end of which is connected to the potential $-V_{EE2}$. The switch S3 also includes a consecutive mode contact S3b which remains without connection. The contact S3a is connected through a reversely poled diode D2 to a terminal J101, which is in turn connected to a power supply shown in FIG. 3, and is also connected to one input of NAND gate A9, to the input of an inverter N9 and to a second input of the gate A25. The output of the inverter N9 is connected to a second input of the Gate A24. The potential at the contact S3a provides a signal U which assumes an "H" level when a single frame mode is selected and which assumes an "L" level when a consecutive mode is selected.

The motor drive also includes a motor switch S4 formed by a changeover switch and which is mechanically interlocked with a drive mechanism. The switch S4 includes a movable contact S4c which is connected to the ground. The switch also includes a winding contact S4a which is engaged by the movable contact upon completion of a shutter release operation and which is connected to one end of a resistor R7 and also connected through an inverter N11 to one input of NAND gate A14. The switch S4 also includes a release contact S4b which is engaged by the movable contact upon completion of a film winding operation and which is connected to one end of a resistor R8 and also connected through an inverter N10 to one input of NAND gate A13. The other end of each of the resistors R7 and R8 is connected to the voltage $-V_{EE2}$. The potential at the release contact S4b represents a signal B which assumes an "H" level when the movable contact of the motor switch S4 is thrown thereto and which assumes an "L" level when the movable contact is thrown to the contact S4a. The potential at the winding contact S4a represents a signal C which assumes an "H" level when the movable contact of the motor switch S4 is thrown thereto and which assumes an "L" level when the movable contact is thrown to the contact S4b.

The output of the gate A13 is connected to the other input of the gate A14, the output of which is connected to the other input of the gate A13. In this manner, the combination of gates A13, A14 forms an RS flipflop. The gate A13 produces an output signal D which assumes an "H" level when the motor switch S4 is thrown to its release contact and which assumes its "L" level when the motor switch S4 is thrown to its winding contact. The gate A14 produces an output signal E which assumes an "L" level when the motor switch S4 is thrown to its release contact and which assumes an "H" level when the switch S4 is thrown to its winding contact. The output of the gate A13 is connected to a third input of the gate A10, to one end of NAND gate A12, to a fourth input of the gate A24, to a fourth input of the gate A25, to the reset signal input of each of a bank of flipflops F2, to one input of NAND gate A18 and to one input of NAND gate A19. The output of the gate A14 is connected to one input of NAND gate A16, to a fourth input of the gate A26, to a third input of NAND gate A27 and to the reset signal input of each of a bank of flipflops F3.

The output of the gate A10 is connected to one input of NAND gate A11, the output of which is connected to the other input of the gate A12. The output of the gate A12 is in turn connected to the other input of the gate A11, whereby the combination of gates A11, A12 forms an RS flipflop. The gate A11 produces an output signal G which is set to an "H" level in the consecutive photographing mode since the gate A9 produces an output of "H" level and the gate A8 produces an output of "H" level as long as the operating switch S1 remains on, which causes the gate A10 to produce an output of "L" level. When the motor switch S4 is thrown to the winding contact, the output signal D from the gate A13 changes to its "L" level, whereby the output signal G from the gate A11 is reset to its "L" level. During the single frame mode, the gate A9 produces an output of "H" level for a given time interval after the switch S1 is turned on, and hence the output signal G from the gate A11 is set to its "H" level. In other words, the RS flipflop formed by the gates A11 and A12 stores the release signal. The output of the gate A11 is connected through the inverter N8 to the other input of the gate A1, and is also connected to a third input of the gate A24 and to a third input of the gate A25.

The output of the gate A1 is connected to the input of an inverter N1, the output of which is connected through a resistor R1 to the base of a PNP transistor T1. The transistor T1 has its emitter connected to the ground and connected through a terminal J1 to one end of a release switch S12 which is disposed within a camera 1, as indicated by a block shown in phantom line. The collector of the transistor T1 is connected through a terminal J2 to the other end of the release switch S12 and to an input of an electromagnetic release circuit 2 which is disposed within the camera 1. The electromagnetic release circuit 2 operates to cause an electromagnetic release of a shutter release mechanism disposed within the camera in response to the release signal F of "L" level from the gate A7 or the release storage signal G of "H" level from the gate A11 to thereby turn the transistor T1 on within the motor drive circuit or in response to the release switch S12 being turned on within the camera.

The bank of flipflops F2 are in cascade connection to define a binary counter. A pulse train of a frequency $f_4$ is supplied to the input of a flipflop thereof which represents the final stage. The output of a flipflop which represents the final stage is connected through an inverter N12 to one input of NAND gate A15, the output of which is connected to one input of NAND gate A16. The output of the gate A16 is connected to the other input of the gate A15, and in this manner the combination of gates A15, A16 forms an RS flipflop. The output of the gate A15 is connected to a third input of the gate A26. The gate A15 produces an output signal H which changes to its "H" level at a given time interval T1 (see FIGS. 6 to 9) determined by the counter formed by the bank of flipflops F2 and the frequency $f_4$ of the pulse train supplied thereto, in response to the motor switch S4 being changed to its winding side. The signal prevents a film winding operation from being initiated immediately upon switching of the motor switch S4 to its winding contact.

The bank of flipflops F3 are in cascade connection to define a binary counter, and a pulse train of a frequency $f_2$ is applied to the input of a flipflop which represents the first stage thereof. The output of a flipflop which represents the final stage of the counter is connected through an inverter N13 to one input of NAND gate A17, the output of which is connected to one input of NAND gate A18. The output of the gate A18 is connected to the other input of the gate A17. In this manner, the combination of gates A17, A18 forms an RS flipflop. The output of the gate A18 is connected to the other input of NAND gate A19, the output of which is connected to one input of NAND gate A21 and to one input of NAND gate A23. The gate A19 produces an output signal I which is produced upon each termination of a photographing operation for one frame, and changes to its "L" level for a given time interval which is determined by the counter defined by the bank of flipflops F2 and the frequency $f_2$ of the pulse train supplied thereto, in response to the motor switch S4 being thrown to its release contact after completing a film winding operation.

The output of the gate A20 is connected to the other input of the gate A21, the output of which is in turn connected to the other input of the gate A20. In this manner, the combination of gates A20, A21 forms an RS flipflop. The output of the gate A20 is also connected to a first input of NAND gate A27, and the output of the gate A21 is also connected to a first input of NAND gate A26. The gate A20 produces an output signal J which assumes an "H" level when the movable mirror is up. Specifically, once the movable mirror moves upward, the output signal M from the inverter N4 changes to its "L" level, the output signal J from the gate A20 is set to its "H" level since the output signal I from the gate A19 is then at its "H" level. The signal J is maintained at its "H" level until a film winding operation for one frame is completed.

The output of the gate A22 is connected to the other input of the gate A23, the output of which is in turn connected to the other input of the gate A22. In this manner, the gates A22, A23 form an RS flipflop. The output of the gate A22 is also connected to a fifth input of the gate A25 and to a fifth input of the gate A26. The gate A22 produces an output signal K which is set to its "H" level in response to the output signal F from the gate A7 when the switch S1 is closed, and is reset to its "L" level by the output signal I from the gate A19 when the motor switch S4 is thrown to its release contact. Accordingly, this output signal K assumes its "H" level from the closure of the switch S1 until a photographing operation for one frame is completed during the consecutive photographing mode, but assumes its "L" level when a photographing operation for a second and a subsequent frame occurs.

The outputs of the gates A24, A25, A26 and A27 are connected to a first to a fourth input, respectively, of NAND gate A28, the output of which is connected to one input of NAND gate A29 which is contained in a motor drive circuit (see FIG. 2) to be described later.

Figure 2:
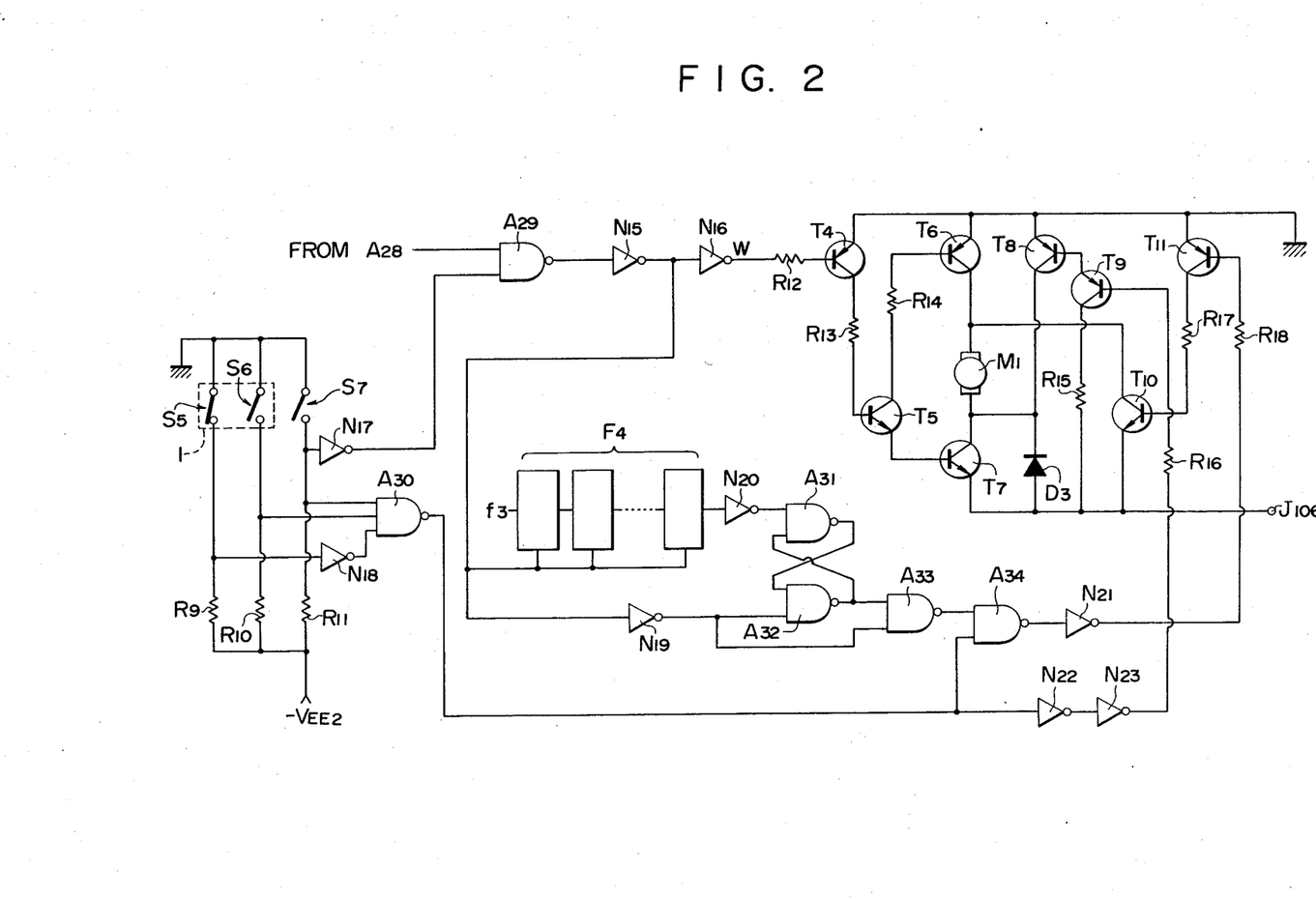
FIG. 2 is a circuit diagram of a motor drive circuit which forms part of the motor drive shown in FIG. 1.

FIG. 2 shows a motor drive circuit and a rewind control circuit of the motor drive. As shown, the output of the gate A29 is connected to the input of an inverter N15, the output of which is connected to the input of another inverter N16, to the reset signal input of each of a bank of flipflops F4, and to the input of a further inverter N19. The output of the inverter N19 is connected to one input of NAND gate A32 and to one input of NAND gate A33.

The output of the inverter N16 is connected through a resistor R12 to the base of a PNP transistor T4. The transistor T4 has its emitter connected to the ground and its collector connected through a resistor R13 to the base of an NPN transistor T5. The transistor T5 has its collector connected through a resistor R14 to the base of a PNP transistor T6 and its emitter connected to the base of an NPN transistor T7. The transistor T6 has its emitter connected to the ground and its collector connected to one end of a motor M1 and to the collector of an NPN transistor T10. The other end of the motor M1 is connected to the collectors of the transistor T7 and a PNP transistor T8. The emitter of the transistor T7 is connected to a terminal J106 which is in turn connected to a power supply (see FIG. 3).

The transistor T8 has its emitter connected to the ground and its collector connected through a reversely poled diode D3 to the terminal J106. The base of the transistor T8 is connected to the emitter of a PNP transistor T9, the collector of which is connected through a resistor R15 to the terminal J106. The base of the transistor T9 is connected through a resistor R16 to the output of an inverter N23. The transistor T10 has its emitter connected to the terminal J106 and its base connected through a resistor R17 to the collector of a PNP transistor T11. The transistor T11 has its emitter connected to the ground and its base connected through a resistor R18 to the output of an inverter N21.

In the motor drive circuit constructed in the manner mentioned above, when the transistor T4 is turned on, the transistors T5, T6 and T7 are also turned on, causing the motor M1 to rotate in a forward direction to wind up a film. When the transistor T11 is turned on, the transistor T10 is also turned on, short-circuiting the motor M1 to apply a braking effort thereto. When the transistor T9 is turned on under the condition that the transistor T10 is on, the transistor T8 is also turned on, causing the motor M1 to rotate in a reverse direction in which the film is rewound.

In FIG. 2, a film detecting switch S5 and a rewind clutch interlocked switch S6 are disposed within the camera 1 indicated by a block shown in phantom lines. The film detecting switch S5 assumes an off condition when film has been loaded into the camera and assumes an on condition when no film is loaded in the camera. This switch has its one end connected to the ground through a terminal, not shown, at a point within the motor drive and has its other end connected through a terminal, not shown, to one end of a resistor R9 and to the input of an inverter N18, both contained within the motor drive. The other end of the resistor R9 is connected to a source of potential $-V_{EE2}$ while the output of the inverter N18 is connected to a third input of a three input NAND gate A30. The rewind clutch interlocked switch S6 is turned on in interlocked relationship with the deactuation of a clutch interposed between a film winding shaft and a film wind-up mechanism in order to effect a film rewind. This switch has its one end connected through a terminal, not shown, to the ground within the motor drive. The other end of the switch S6 is connected through a terminal, not shown, to one end of a resistor R10 and to a second input of the gate A30, both contained within the motor drive. The other end of the resistor R10 is connected to the source of potential $-V_{EE2}$.

The motor drive includes a rewind lever interlocked switch S7 which is turned on interlocked relationship with a rewind lever (not shown) when the latter assumes its rewind condition. The switch S7 has its one end connected to the ground and its other end connected through an inverter N17 to the other input of the gate A29, and also connected to a first input of the gate A30 and to one end of a resistor R11, the other end of which is connected to the source of potential $-V_{EE2}$. The output of the gate A30 is connected to the other input of the gate A34 and to the input of an inverter N22, the output of which is connected to the input of the inverter N23.

The bank of flipflops F4 are in cascade connection to define a binary counter. A pulse train of a frequency $f_3$ is applied to the input of a flipflop which represents the first stage of the counter. The output of a flipflop which represents the last stage of the counter is connected through an inverter N20 to one input of NAND gate A31. The output of the gate A31 is connected to one input of NAND gate A32, the output of which is connected to the other input of the gate A31. In this manner, the combination of gates A31, A32 forms an RS flipflop. The output of the gate A32 is connected to the other input of the gate A33, the output of which is connected to the other input of the gate A34, the output of which is in turn connected to the input of the inverter N21.

An output from the gate A33 is effective to apply a braking effort to the motor M1 by turning the transistors T11 and T10 on for a time interval determined by the counter defined by the bank of flipflops F4 and the frequency $f_3$ of the pulse train applied thereto since the motor M1 ceases to be driven in the forward direction in response to the turn-off of the transistor T4. An output from the gate A30 is effective to cause a film rewind by a rotation of the motor M1 in the reverse direction, by turning the transistors T11, T10 on through the gate A34 and the inverter N21, and turning the transistors T9, T8 on through the inverters N22, N23 when the film detecting switch S5 is off, and the rewind clutch interlocked switch S6 and the reset lever interlocked switch S7 are both on. When the entire film is rewound into its associated patrone or magazine and no film is loaded into the camera, the film detecting switch S5 is turned on to turn the transistors T8 to T11 off, whereby the rotation of the motor M1 which effects the film rewind operation ceases.

Figure 3:
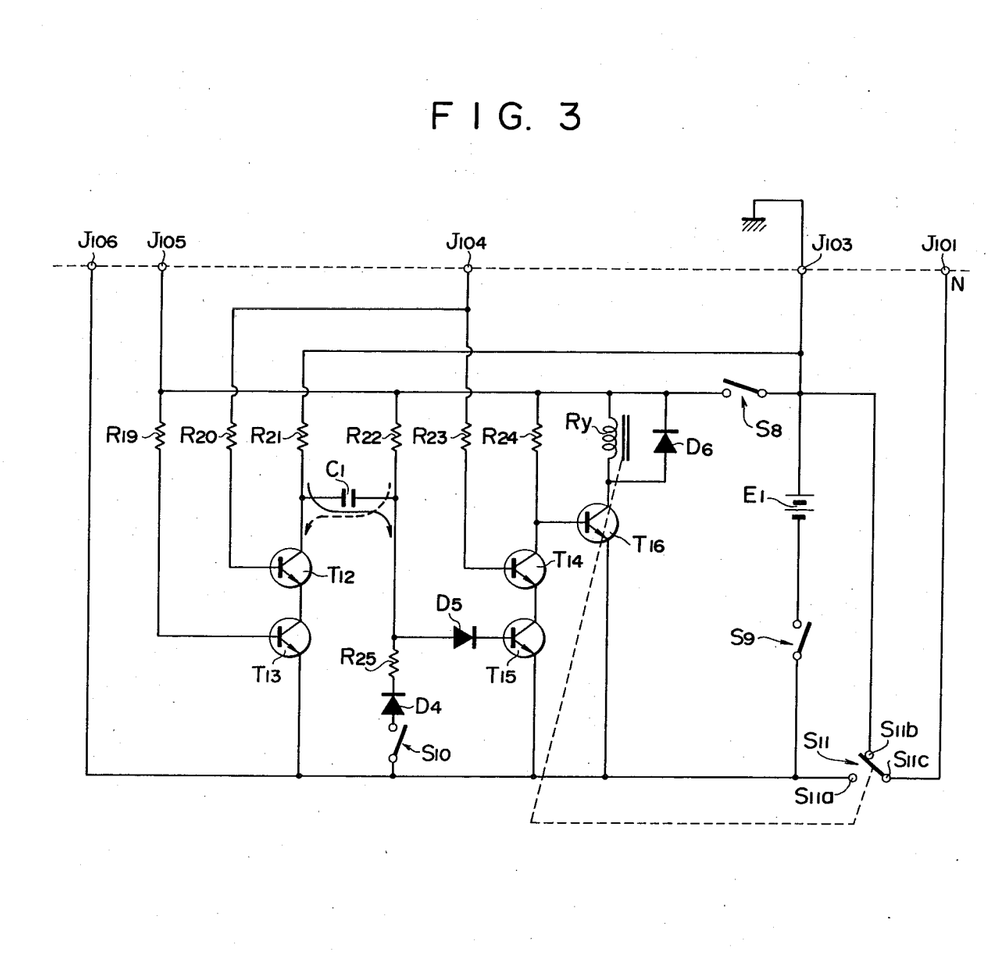
FIG. 3 is a circuit diagram of a power supply used with the motor drive shown in FIGS. 1 and 2.

FIG. 3 shows a power supply which is used in connection with the motor drive. It should be noted that the power supply also includes a control circuit associated with the motor drive. Specifically, the power supply is electrically connected to the motor drive through a plurality of terminals J101, J103, J104, J105 and J106. The terminal J103, which is connected to the ground within the motor drive, is connected to the positive terminal of a battery E1, the negative terminal of which is connected through a power switch S9 to the terminal J106. The positive terminal of the battery E1 is also connected through an operating switch S8 to the terminal J105, which is in turn connected through a resistor R19 to the base of an NPN transistor T13. The transistor T13 has its emitter connected to the terminal J106 and its collector connected to the emitter of an NPN transistor T12.

The transistor T12 has its base connected through a resistor R20 to the terminal J104 and its collector connected through a resistor R21 to the terminal J103 and also connected to one end of a capacitor C1. The other end of the capacitor C1 is connected through a resistor R22 to the terminal J105 and also connected to the anode of a diode D5 and to one end of a resistor R25. The other end of the resistor R25 is connected through a reversely poled diode D4 to one end of a photographing mode selection switch S10, the other end of which is connected to the terminal J106. The purpose of the switch S10 is to select either a single frame mode or a consecutive mode, and assumes an off condition for the consecutive mode and an on condition for the single frame mode.

The cathode of the diode D5 is connected to the base of an NPN transistor T15, which has its emitter connected to the terminal J106. The collector of the transistor T15 is connected to the emitter of an NPN transistor T14, which has its base connected through a resistor R23 to the terminal J104 and which has its collector connected through a resistor R24 to the terminal J105 and also connected to the base of an NPN transistor T16. The transistor T16 has its emitter connected to the terminal J106 and its collector connected to the terminal J105 through a parallel combination of a relay Ry and a diode D6. The power supply also includes a changeover switch S11 which is operated by the relay Ry. The switch S11 includes a brake contact S11a connected to the terminal J106 and a power supply terminal S11b connected to the terminal J103. The movable contact S11c of the switch is connected to the terminal J101.

The operation of the motor drive will now be described. Initially considering the control circuit within the power supply shown in FIG. 3, it is assumed that the consecutive mode is selected by turning the switch S10 on. During this mode, when the power switch S9 is turned on, the transistors T12 and T13 are initially off, and there occurs a current flow through a path including the resistor R21, capacitor C1, diode D5, the base-emitter path of the transistor T15 and the power switch S9, thus charging the capacitor C1 to the pole polarity indicated by a solid line arrow. Since the operating switch S8 is open now and the transistor T16 is not connected to the battery E1, the relay Ry remains deenergized. Subsequently when the operating switches S1 and S8 are turned on, the transistors T12 and T13 are turned on, and the voltage across the capacitor C1 is applied through the transistors T12 and T13 to the base of the transistor T15, whereby the transistor T15 is turned off. The transistor T16 is then turned on, energizing the relay Ry to change the switch S11 from the contact S11b to the contact S11a. This causes the potential at the terminal J101 (or signal N) to change from "H" to "L" level. As the operating switch S1 is turned on, the transistor T1 is turned on to initiate the operation of the electromagnetic release circuit 2 of the camera. Simultaneously, the motor M1 begins to rotate, attempting to drive the shutter release mechanism of the camera from the motor drive. Upon completion of the shutter release operation, the motor switch S4 is change from its contact S4b to its contact S4a.

On the other hand, the movable mirror is driven upward in response to the initiation of the shutter release operation, and the mirror switch S2 is changed from its contact S2a to its contact S2b in a corresponding manner. This causes the transistor T12 to be turned off and the transistor T15 to be turned on. However, since the transistor T14 is turned off, the transistor T16 is maintained conductive, thus maintaining the relay Ry energized. During the time the movable mirror assumes its up position and the shutter operation continues, the motor M1 remains short-circuited. When the mirror moves down in response to the termination of the shutter operation, the mirror switch S2 is again changed to its contact S2a, whereby the transistor T14 is turned on by terminal J104 (FIG. 1). However, the transistor T12 is turned on while the transistor T15 is turned off, whereby the transistor T16 is maintained conductive, thus maintaining the relay Ry energized.

Conditions which must be satisfied to perform a shutter release operation and a film winding operation in the motor drive will be described below.

(1) A shutter release operation is performed
1: if the following four requirements are concurrently satisfied:
   The consecutive mode is established (or signal U is "L")
   The storage of a release (or signal G is "H")
   Movable mirror is down (or signal M is "H")
   Motor switch S4 is thrown to the release contact (or signal D is "H");
   whereby the signal O is "L", which is required to effect a shutter release operation;
or alternatively,
2: if the following five requirements are concurrently satisfied:
   Single frame mode is established (or signal U is "H")
   The storage of a release (or signal G is "H")
   Movable mirror is down (or signal M is "H")
   It is the first release after the closure of the operating switch S1 (or signal K is "H")
   The motor switch S4 is thrown to its release contact (or signal D is "H");
   whereby the signal P is "L", which is required to effect a shutter release operation.

(2) A film winding operation takes place in the following two instances.
1: If the following five requirements are concurrently satisfied:
   The motor switch S4 is thrown to its winding contact (or signal E is "H")
   It is the first winding operation after the closure of the operating switch S1 (or signal K is "H")

A given time interval has passed since the motor switch S4 has been changed to the winding side (or signal H is "H")

The movable mirror is down (or signal M is "H")

No storage of the movable mirror having assumed its up position (or signal J is "L");

whereby the signal Q is "L", which is required to effect a film winding operation.

2: If the following three requirements are concurrently satisfied:

The motor switch S4 is thrown to its winding contact (or signal E is "H")

The movable mirror is down (or signal M is "H")

Storage of the movable mirror having assumed its up position (or signal J is "H");

whereby the signal R is "L", which is required to effect a film winding operation.

In either one of the described four instances, one of the signals O, P. Q and R assumes its "L" level, whereby the signal V assumes its "H" level. Accordingly, if the reset lever interlocked switch S7 is off, the gate A29 produces an output of "L", and hence the inverter N15 produces an output of "H" level and an output signal W from the inverter N16 assumes its "L" level. This turns the transistors T4, T5, T6 and T7 on, whereby the motor M1 rotates in the forward direction to effect a shutter release operation or a film winding operation.

Figure 4:
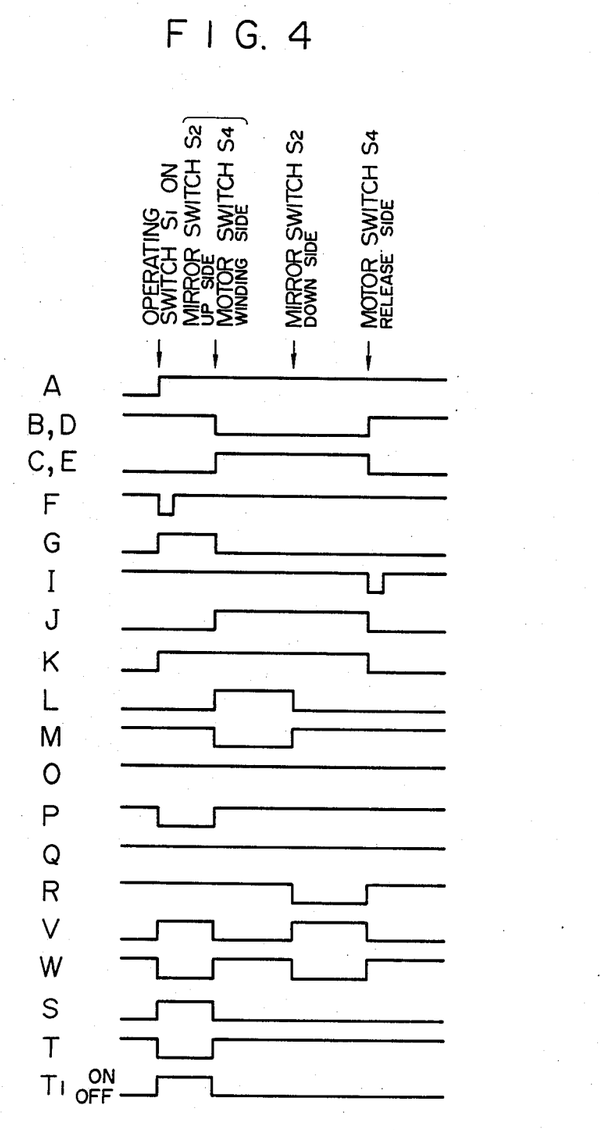
FIGS. 4 to 9 graphically show series of timing charts which illustrate the operation of the motor drive shown in FIGS. 1 to 3.

The operation of the motor drive during the single frame photographing mode will now be described with reference to a series of timing charts shown in FIG. 4. Initially, when the mode selection switch S3 is thrown to its single frame contact S3a and the operating switch S1 is turned on, the input signal A to the inverter N5 assumes its "H" level, with the consequence that the output signal F from the gate A7 assumes its "L" level for a given time interval. At the same time, the transistor T1 is turned on to activate the electromagnetic release circuit 2 of the camera. During the single frame mode, the signal U is "H" as is the signal G. The signal D assumes its "H" level when a release operation takes place, and since it is the first photographing operation after the closure of the operating switch S1, the signal K is "H". Since the movable mirror is down, the signal M is "H".

Accordingly, all inputs to the gate A25 are "H", and hence the output signal P therefrom is "L". This allows the motor M1 to rotate to effect a release operation. It will be appreciated that this corresponds to the instance (1)-2 mentioned above. If the motor drive is mounted in a camera including a mechanical shutter release, the rotation of the motor M1 is transmitted to the camera 1 to effect a shutter release operation. Subsequently when the movable mirror of the camera moves upward, the signal M changes to "L", whereby the motor M1 ceases to rotate, and an exposure process takes place. The signal J changes to "H". When the movable mirror moves down again upon completion of the exposure process, the signal M returns to "H". Since the motor switch S4 is changed to its winding contact S4a, the signal E becomes "H". This means that all inputs to the gate A27 are "H", and this gate produces the output signal R of "L". Accordingly, the motor M1 rotates again to effect a film winding operation. This corresponds to the instance (2)-2 mentioned above. Since the motor switch S4 changes to its release contact S4b upon completion of the winding operation, the signal E changes to "L" as does the signal K. When the signal E changes to "L", the output signal R from the gate A27 becomes "H", which ceases the rotation of the motor M1 to stop the winding operation. At this time, the signal G is "L", and since there is no storage of a release, a next release operation does not take place unless the operating switch S1 is turned on again.

Figure 5:
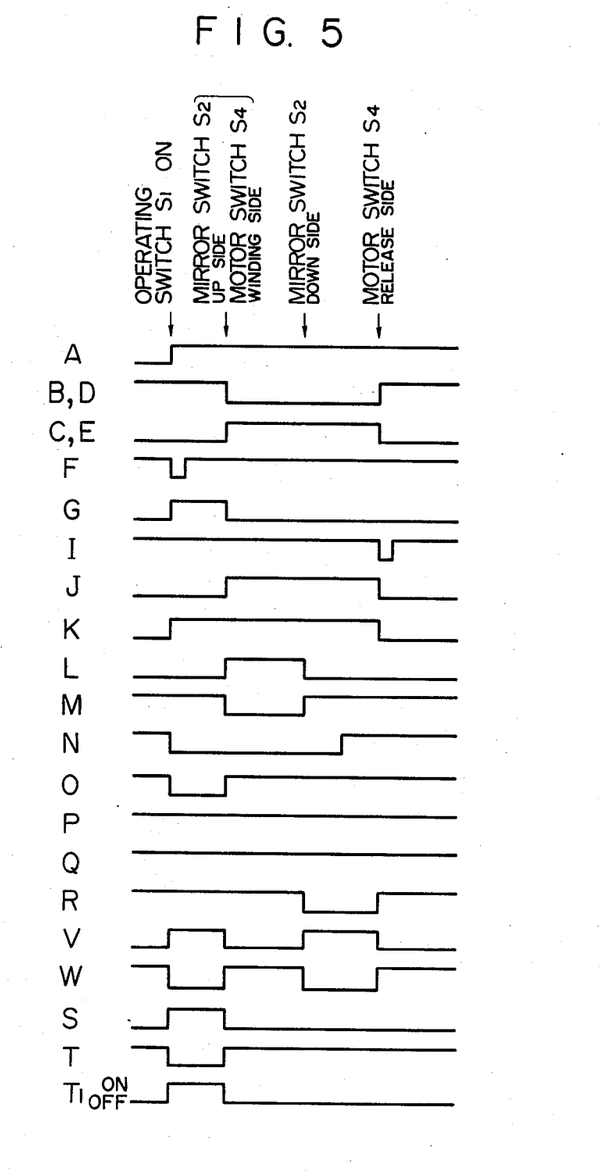

The operation of the motor drive which occurs when the mode selection switch S3 thereof is changed to its consecutive mode contact S3b and the mode selection switch S10 in the power supply is turned on to establish the single frame mode will now be described with reference to a series of timing charts shown in FIG. 5. In this instance, the changeover switch S11 is initially thrown to its contact S11b to connect the terminal J101 with the positive terminal of the battery E1, so that the signal U is "H". However, when the operating switch S1 is turned on, the switch S11 changes to its contact S11a, whereby the terminal J101 is connected to the negative terminal of the battery E1, thus inverting the signal U to "L". This causes the output signal O from the gate A24 to be "L", causing the motor M1 to rotate to effect a release operation. This corresponds to the instance (1)-1 mentioned above. An exposure process takes place in a manner similar to the single frame mode mentioned above. A winding operation takes place in a similar manner, and since the changeover switch S11 is changed to its contact S11b before the winding operation is completed, the motor drive ceases to operate without proceeding into a next release operation. It is to be understood that the mode selection switch S3 in the motor drive and the mode selection switch S10 in the power supply are arranged such that if one of these switches selects the single frame mode, this mode is preferentially selected.

Figure 6:
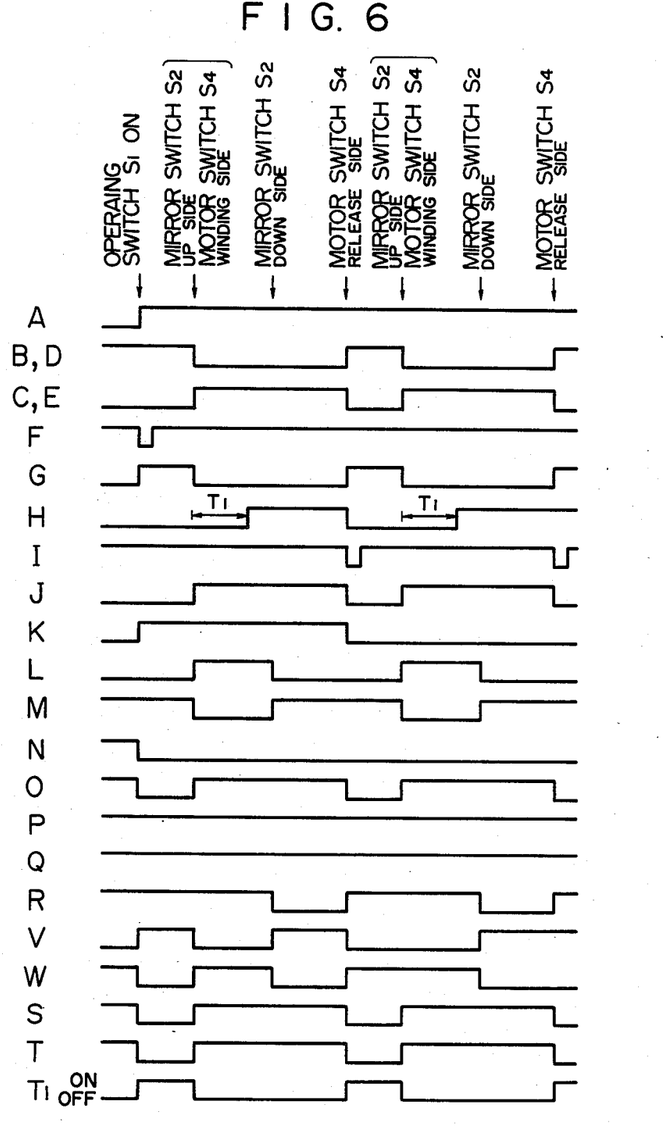

The operation of the motor drive during the consecutive mode will now be described with reference to a series of timing charts shown in FIG. 6. During this mode, both the mode selection switch S3 within the motor drive and the mode selection switch S10 in the power supply are thrown to their contacts which establish the consecutive mode. If the operating switch S1 is then turned on, the gate A7 produces the release signal F, which turns the transistor T1 on to activate the electromagnetic release circuit 2. The signals M, G and D are "H" while the signal U is "L", whereby all the inputs to the gate A24 are "H", allowing the motor M1 to rotate. This corresponds to the instance (1)-1 mentioned above. If the motor drive is mounted in a camera including a mechanical release mechanism, the rotation of the motor M1 is transmitted to the camera 1 to effect a shutter release operation. Subsequently when the movable mirror moves up, the signal M is inverted to "L", whereby the motor M1 ceases to rotate. An exposure process then proceeds, and the signal J changes to "H".

When the movable mirror moves down upon completion of the exposure process, the signal M reverts to "H". Since the motor switch S4 is switched to its winding contact S4a, the signal E changes to "H", providing all inputs to the gate A27 which are "H", whereby the output signal R therefrom becomes "L". Accordingly, the motor M1 again rotates to effect a winding operation. This corresponds to the instance (2)-2 mentioned above. Upon completion of the winding operation, the motor switch S4 again switches to its release contact S4b, changing the signal D to "H". Hence, the flipflop formed by the gates A11 and A12 is reset, causing the signal G to resume "H". The signal G is fed through the inverter N8 to the gate A1, the output of which is fed through the inverter N1 to the base of the transistor T1, thus turning the latter on. As a result, the electromagnetic release circuit 2 of the camera is activated, effecting a shutter release operation. All the inputs to the gate A24 are also "H", and hence the signal O becomes "L", allowing the motor M1 to rotate. If the camera includes a mechanical shutter release mechanism, the rotation of the motor M1 is effective to cause a shutter release operation. Subsequently, a photographing operation for a second frame takes place in the same manner as for the first frame. As long as the operating switch S1 is turned on, the output signal from the gate A8 is "H", whereby the signal D fed through the gate A10 causes the flip-flop formed by the gates A11 and A12 to be reset, consecutively repeating a photographing operation.

Figure 7:
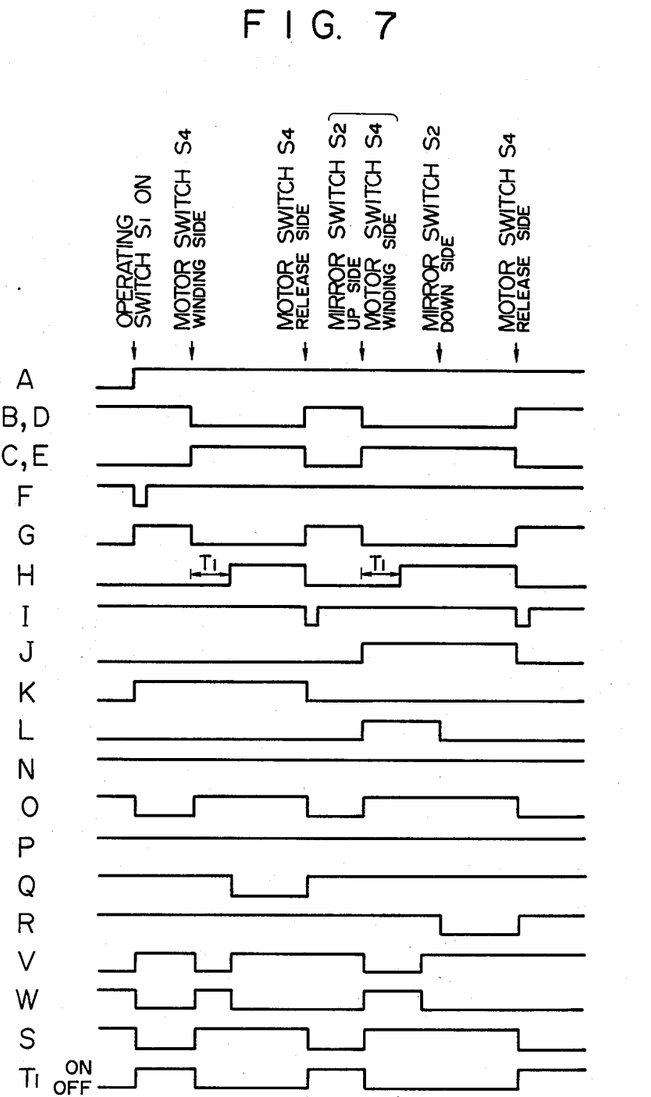

The operation of the motor drive when mounted in a camera including a film which has undergone no winding operation will now be described with reference to a series of timing charts shown in FIG. 7. It is initially assumed that the mode selection switch S3 within the motor drive as well as the mode selection switch S10 in the power supply are both thrown to select the consecutive mode. When the operating switch S1 is closed under this condition, the transistor T1 is turned on to activate the electromagnetic release circuit 2 of the camera in a manner similar to that mentioned above for the consecutive mode. However, a shutter release operation does not take place since the shutter release mechanism has not been charged inasmuch as a film winding operation has not taken place within the camera. If the camera includes a mechanical release mechanism, all the inputs to the gate A24 are "H", and hence this gate produces the output signal O of "L" level, causing the motor M1 to rotate. However, since no film winding operation has taken place within the camera, a shutter release operation does not occur in practice.

The rotation of the motor M1 causes the motor switch S4 to switch to its winding contact S4a, whereupon the signal E becomes "H". Since the movable mirror has never been driven upward, the output from the gate A21 remains "H". Since the movable mirror remains at its down position, the signal M is "H". Since it is the first photographing operation, the signal K is "H". Additionally, when a given time interval $T_1$ passes after the motor switch S4 has been switched to its winding contact S4a, the signal H changes to "H". Accordingly, all the inputs to the gate A26 are "H", and the output signal Q therefrom is "L". Thus, the motor M1 rotates again, effecting a film winding operation. This corresponds to the instance (2)-1 mentioned above. Subsequently, a photographing operation is consecutively repeated as long as the operating switch S1 remains depressed, in a manner similar to that mentioned above for the consecutive mode. It will be understood that when the requirements for the release operation are satisfied, the signal O assumes its "L" level. If the requirements for the winding operation are satisfied, the signal R assumes its "L" level. In each instance, such signal causes the motor M1 to rotate to effect a shutter release or a film winding operation.

When the single frame mode is established in the motor drive when mounted in a camera carrying a film which has undergone no winding operation, the first time that the operating switch S1 is turned on activates the electromagnetic release circuit 2 in the same manner as during the consecutive mode, but in practice, a shutter release operation does not take place since the shutter has not been charged. If the camera includes a mechanical release mechanism, all the inputs to the gate A25 are "H", and hence the output signal P therefrom is "L", causing the motor M1 to rotate. However, since no winding operation has occurred for the film within the camera, a shutter release operation does not take place in practice. Subsequently when the rotation of the motor M1 causes the motor switch S4 to switch to its winding contact S4a, all the inputs to the gate A26 become "H" after a given time interval $T_1$, and the output signal Q therefrom becomes "L", causing the motor M1 to rotate, thus effecting a film winding operation. It should be noted that during the signal frame mode, the motor drive ceases to operate at the time the film winding operation has been completed, because the gate A11 does not output the signal G once the release operation takes place. It should be noted that the normal operation in the single frame mode takes place if the operating switch S1 is turned on again subsequently.

Figure 8:
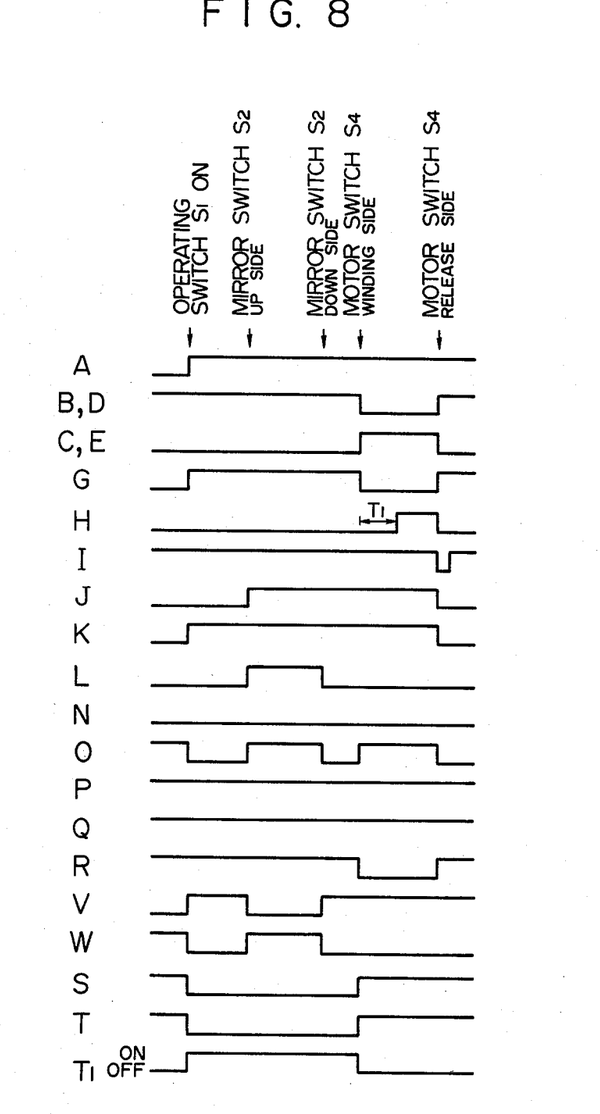

The operation of the motor drive when mounted in a camera in which the electromagnetic release circuit 2 operates so rapidly that the motor switch S4 remains thrown to its release contact S4b when the movable mirror has been driven to its up position will now be described with reference to a series of timing charts shown in FIG. 8. In this instance, it will be seen that the movable mirror moves upward during the rotation of the motor M1 to effect a release operation. As the mirror reaches its upper position, the signal M changes to "L", and the signal O (or P) changes from "L" to "H" so that the motor M1 temporarily ceases to rotate. When the movable mirror moves down upon completion of an exposure process, the signal O (or P) reverts to "L", whereby the motor M1 resumes its rotation, performing the release operation which has been interrupted during the course of its operation. When the rotation to effect such release operation is completed, the motor switch S4 switches to its winding contact S4a, whereby the signal R becomes "L", allowing the motor M1 to rotate to effect a winding operation in a consecutively following manner.

Figure 9:
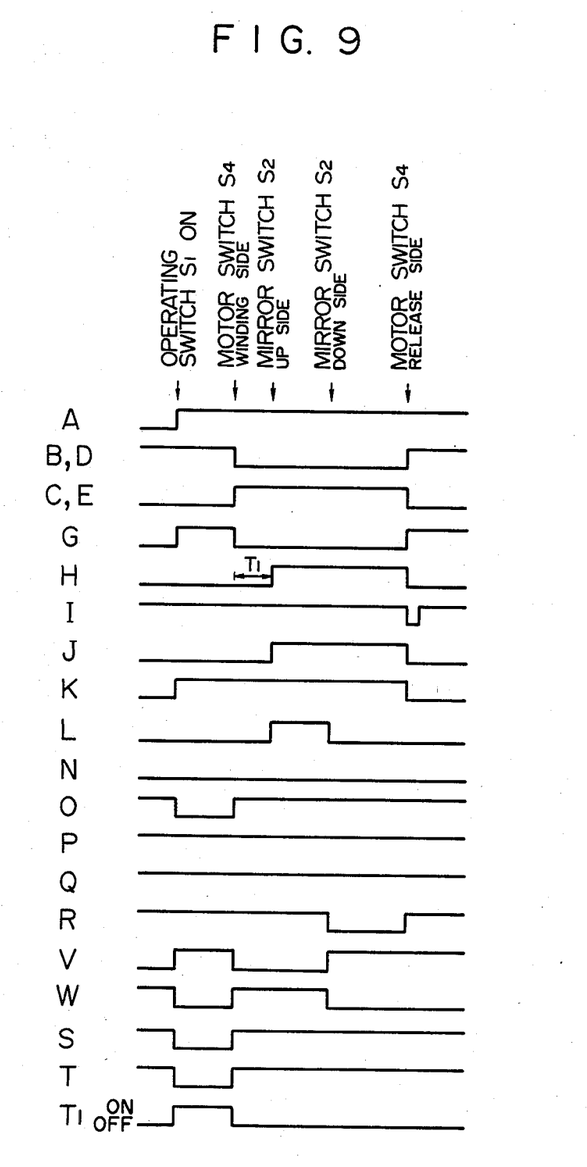

FIG. 9 shows a series of timing charts which illustrate the operation of the motor drive when mounted in a camera in which an electromagnetic release operation takes place subsequent to the termination of operation of another control mechanism such as a diaphragm control mechanism or an automatic focussing mechanism, for example. In a camera of this kind, it takes an increased time length from the turn-on of the operating switch S1 to the completion of the upward movement of the movable mirror. Accordingly, there is a likelihood that the motor switch S4 may switch to its winding contact S4a before the movable mirror completes its upward movement. It is initially assumed that the consecutive mode is established in both the camera and the motor drive. When the operating switch S1 is turned on, the release signal is supplied to the electromagnetic release circuit 2, which is then activated. Simultaneously, the signal O changes to "L", causing the motor M1 to rotate. At a given time interval after the initiation of rotation of the motor M1, the motor switch S4 switches to its winding contact S4a. However, since the movable mirror has not yet reached its up position, the signal J remains at the "L" level. Accordingly, at this time, the motor M1 does not rotate to effect a film winding operation, but ceases to rotate. When the movable mirror reaches its up position, the signal J inverts to "H". When the movable mirror moves down subsequently, the signal M changes to "H", whereby the signal R becomes "L", effecting a winding operation.

In the embodiment described above, a switch which is interlocked with a movable mirror has been used as means for detecting the exposure process occurring within the camera. However, such detecting means is not limited to this switch, but alternatively a switch which is mechanically interlocked with a shutter release mechanism may also be used instead.

What is claimed is:

1. A motor drive for mechanically transmitting the rotation of a motor to a camera to which the motor drive is releasably mounted in order to enable a shutter release operation of the camera shutter and/or a film winding operation within the camera; comprising:

means in said motor drive for producing a motor drive signal and an electromagnetic release signal substantially simultaneously in response to the operation of an operating member in said motor drive, both said motor drive signal and said electromagnetic signal being electrical signals;

means for transmitting the electromagnetic release signal from the motor drive to said camera which is of the electromagnetic release type and which includes a shutter release mechanism;

said shutter release mechanism including means responsive to said electromagnetic release signal for transmitting an exposure operation signal from said camera of the electromagnetic release type to the motor drive just prior to operation of the shutter, the exposure operation signal being produced by means for detecting the exposure operation, which means is located within said camera of the electromagnetic release type; means for preventing the rotation of the motor in response to the exposure operation signal during the exposure operation and means for energizing the motor when the exposure operation signal is absent and the motor drive signal is present.

2. A motor drive according to claim 1 in which said means for producing an electromagnetic release signal comprises a normally open switch which is closed in response to the depression of the operating member, and a pulse generator for producing the electromagnetic release signal in the form of a single pulse in response to the closure of the switch.

3. A motor drive according to claim 1 in which said means for transmitting the electromagnetic release signal comprises terminal means which provides an interconnection between the motor drive and the camera, and a switching transistor connected in parallel with a release switch disposed within the camera through the terminal means.

4. A motor drive according to claim 1 in which said means for detecting an exposure operation comprises a changeover switch mechanically interlocked with an upward and downward movement of a movable mirror disposed within the camera for generating a first signal when the mirror is in the up position and a second signal when the mirror is in the down position.

5. A motor drive according to claim 1, further including a changeover switch including a pair of transfer contacts, the switch being switched to engage one of the contacts upon completion of the rotation of the motor which effects a shutter release operation and being switched to engage the other contact upon completion of the rotation of the motor which effects a film winding operation.

6. A motor drive according to claim 1 in which said means for ceasing the motor comprises a logic circuit connected between said means for producing the electromagnetic release signal and a motor control circuit.

7. A motor drive according to claim 1, further including a photographing mode selection switch which permits a selection between a single frame photographing mode and a consecutive photographing mode.

8. A motor drive according to claim 1 wherein the electromagnetic shutter is powered by a first power supply;

said motor drive connected with a second separate power supply, the second power supply being part of a motor control circuit.

9. A motor drive for mechanically transmitting the rotation of a motor to a camera in which the motor drive is mounted in order to effect a shutter release operation and/or a film winding operation of the camera; comprising:

means for producing an electromagnetic release signal in response to the operation of an operating member;

means for transmitting the electromagnetic release signal to said camera in which the motor drive is mounted and which includes an electromagnetic shutter release mechanism;

means for transmitting an exposure operation signal to the motor drive, the exposure operation signal being produced by means disposed within the camera which detects an exposure operation which occurs therein;

first storage means responsitve to the exposure operation signal for storing the initiation of an exposure operation which occurs within the camera;

second storage means for storing the rotation of the motor to effect a shutter release operation which occurs after the operation of the operating member;

means responsive to outputs from the first and the second storage means for detecting the failure of an exposure operation within the camera despite the rotation of the motor to effect a shutter release operation subsequent to the operation of the operating member;

and means responsive to an output from the last mentioned detecting means for initiating the rotation of a motor to effect a film winding operation at a given time interval after the completion of the rotation of the motor which effects a shutter release operation.

10. A motor drive according to claim 9 in which said means for producing an electromagnetic release signal comprises a normally open switch which is closed in response to the depression of the operating member, and a pulse generator for producing the electromagnetic release signal in the form of a single pulse in response to the closure of the switch.

11. A motor drive according to claim 9 in which said means for transmitting the electromagnetic release signal comprises terminal means which provides an interconnection between the motor drive and a camera, and a switching transistor connected in parallel with a release switch disposed within the camera through the terminal means.

12. A motor drive according to claim 9 in which said means for detecting an exposure operation comprises a changeover switch which is mechanically interlocked with an upward or a downward movement of a movable mirror disposed within the camera.

13. A motor drive according to claim 9 in which the first storage means comprises an RS flipflop.

14. A motor drive according to claim 9 in which the second storage means comprises an RS flipflop.

15. A motor drive according to claim 9 in which said detecting means comprises a logic circuit connected between the changeover switch and a motor control circuit.

16. A motor drive according to claim 9, further including a changeover switch including a pair of transfer contacts, the changeover switch switching to one of the contacts upon completion of the rotation of the motor which effects a shutter release operation and switching to the other of the contacts upon completion of the rotation of the motor which effects a film winding operation.

17. A motor drive according to claim 9, further including a photographing mode selection switch which permits a selection between a single frame photographing mode and a consecutive photographing mode.

18. A motor drive according to claim 9 which is adapted to be connected with a separate power supply which includes part of a motor control circuit.

19. A motor drive according to claim 17, further including another means for producing an electromagnetic release signal which is effective to store the electromagnetic release signal whenever the mode selection switch has selected the consecutive mode and for producing a fresh electromagnetic release signal during a photographing operation for a second and subsequent frame in the consecutive mode.

20. A motor drive according to claim 19 in which said another means for producing an electromagnetic release signal comprises a flipflop.

21. A motor drive according to claim 9 in which said time interval is determined by a counter comprising a cascade connection of flipflops for counting down a pulse train.

22. A motor drive for mechanically transmitting the rotation of a motor to a camera having a shutter with a mechanical type shutter release in which the motor drive is mounted in order to enable a shutter release operation and/or a film winding operation of the camera; said motor drive comprising:

means in said motor drive for substantially simultaneously producing an electrical drive signal and an electrical electromagnetic release signal in response to the operation of an operating member provided in said motor drive;

means for transmitting the electromagnetic release signal to a camera in which the motor drive is mounted and which includes a shutter with an electromagnetic shutter release mechanism, thereby enabling the motor drive to be mounted in a camera having an electromagnetic shutter release mechanism as well as in a camera having a mechanical shutter release mechanism;

said shutter release mechanism initiating a shutter operation of said shutter responsive to said electromagnetic release signal;

said shutter generating a signal just prior to opening of said shutter;

means in the motor drive responsive to said shutter signal from said camera signal for preventing operation of the motor during the time that the shutter is open.

* * * * *